(12) United States Patent
Huang et al.

(10) Patent No.: US 6,386,670 B1
(45) Date of Patent: May 14, 2002

(54) PRINTING BLACK AND THREE COLORS FROM THREE COLOR DATA

(75) Inventors: Xuan-Chao Huang; Brant Dennis Nystrom, both of Lexington; Richard Lee Reel, Georgetown, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/772,648

(22) Filed: Jan. 30, 2001

(51) Int. Cl.[7] .............................. B41J 2/205; G03F 3/08
(52) U.S. Cl. .......................................... 347/15; 358/522
(58) Field of Search ..................... 347/15, 43; 358/518, 358/523, 522

(56) References Cited

U.S. PATENT DOCUMENTS

| | | | | |
|---|---|---|---|---|
| 5,305,119 A | * | 4/1994 | Rolleston et al. ........... | 358/522 |
| 5,537,228 A | * | 7/1996 | Dillinger .................... | 358/502 |
| 5,978,011 A | * | 11/1999 | Jacob et al. ................. | 347/251 |

OTHER PUBLICATIONS

Henry R. Kang; Color Technology for Electronic Imaging Devices, pp. 34–42; SPIE—The International Society for Optical Engineering, Bellingham, WA, 1997.

* cited by examiner

Primary Examiner—Thinh Nguyen
(74) Attorney, Agent, or Firm—John A. Brady

(57) ABSTRACT

Data in only three colors is printed in the three colors plus black. The coverage amount represented by the smallest intensity of the three colors is determined. When that amount is above a predetermined value at which observable grain becomes minimal, an exponent value is determined and a formula is followed. As an additional improvement, lightness is redefined on a model which favors less black at the lighter values and more black at the darker values. Hue is to remain the same, and is known from the original color data. The chroma is refined based on the original chroma, CMY and CMYK full gamut boundaries. Since black, lightness, chroma and hue are known, the new three color values are found by known techniques.

3 Claims, 6 Drawing Sheets

PRINTING BLACK AND THREE COLORS FROM THREE COLOR DATA

TECHNICAL FIELD

This invention relates to printing, such as ink jet printing, by overlaying minute dots or other picture elements by employing elements in three separate colors and elements in black when the image is defined only in the three separate colors.

BACKGROUND OF THE INVENTION

This invention provides a method to efficiently mix black ink with color inks to produce a more smoothed and maximized color gamut for color printing.

In recent years color printers have been developed for home and office use. These printers have typically used four different inks in the colors of cyan, magenta, yellow and black (hereinafter "CMYK") inks. If the cyan, magenta and yellow (hereinafter "CMY") inks are ideal, the black ink is not necessary for producing the desired color gamut. In practice, however, the black ink is required for higher quality printing since the CMY inks cannot produce the desired darkness as provided by the black ink for plain paper. On the other hand, producing the same darkness requires approximately three times amount of inks for CMY printing as for CMYK printing. Most papers cannot sustain this much ink for dark images. Therefore, the introduction of black ink in color printing is popular and important.

In the CMYK printing, one of the important issues is how to mix the black ink into the color inks. One might argue that we could use all available combinations of the four inks. It is, however, improper in practice since some combinations (like c=255, m=255, y=255 and k=255, where 255 represents maximum intensity) yield too much ink. To conveniently control the amount of inks, one often uses one-to-one mixing method—mix each point as used in the CMY printing into one point in the CMYK printing and carefully determine the amount of inks on that point.

Suppose a colorant point without black ink (hereinafter "CMY point") is given by $(c_0, m_0, y_0)$, and the counterpart colorant point with black (hereinafter "CMYK point") is given by $(c, m, y, k)$. A popular practice to convert the CMY to CMYK point can be summarized as follows:

(1) Determine the black ink usage (k) by a one-dimensional lookup table:

$$k = f(\mu), \quad (1)$$

where $$\mu = \min(c_0, m_0, y_0) \quad (2)$$

(2) Compute the c, m and y values for the CMYK point with the following equations:

$$c = c_0 - a_1 k \quad (3)$$

$$m = m_0 - a_2 k \quad (4)$$

$$y = y_0 - a_3 k \quad (5)$$

where $a_1$, $a_2$ and $a_3$ are constants that are determined by experiments.

The above method has the following disadvantages:

(1) The black ink usage is not efficient since the black ink amount is the same for a given minimum value of $c_0$, $m_0$, $y_0$, regardless of the total amount of inks of a point. For example, if a CMY point (65, 75, 85) is mixed using k=20 (in Equations 1–2, $\mu$=65, f($\mu$)=20), then the CMY point (65, 255, 255) will be mixed using the same amount of k=20 since the minimum value ($\mu$) of either CMY is the same (equal to 65). However, our experiments indicate that the darker CMY point (65, 255, 255) should be mixed with more amount of black ink than the lighter point (65, 75, 85) due to, among other things, the reason of reducing more total amount of inks for the darker point.

(2) There is no systematic procedure to optimize the ink mixing. One may start with an initial black ink lookup table (Equations 1–2), mix k with c, m and y by changing $a_1$, $a_2$ and $a_3$ constants (Equations 3–5), and then repeat the process for each newly-selected black ink lookup until the desired mixing result is obtained. This is a very time-consuming process. Therefore, it is difficult for this method to obtain a smoothed and gamut-maximized CMYK mixing.

The objective of this invention is to develop a new system and method for the one-to-one mixing. It will efficiently mix the black ink into the CMY colorants to produce smoothed and maximized color gamut for color printing.

Throughout this invention, we have referred to colorant space, CIELAB color system/space, color gamut, and Neugebauer Model. These are described as follows:

Colorant Space: A colorant space is referred to as a Cartesian coordinate system. For the CMY three-ink printing, it is a three-dimensional system consisting of C, M and Y three axes. Each point in the space is defined by three coordinates (c, m, y) and each coordinate is a digital count ranging from 0 to 255 (8-bit representation). For CMYK four-ink printing, the colorant space is a four-dimensional system consisting of C, M, Y, and K four axes. Each point in the space is defined by four coordinates (c, m, y, k) and each coordinate is also a digital count ranging from 0 to 255 (8-bit representation).

CIELAB Color System/Space: The CIELAB color system was established by the Commission Internationale de l'Eclairage (CIE) in 1976. It is a color space to be used for the specification of color differences. It consists of L*, a*, b*, three variables as Cartesian coordinates to form a three-dimensional color space as shown in FIG. 1. The L* is a correlate to perceived lightness ranging from 0.0 for black to 100.0 for a diffuse white. The a* and b* dimensions correlate approximately with red-green and yellow-blue chroma perceptions. They take on both negative and positive values. Their maximum values are limited by the physical properties of materials. The color difference ($\Delta E^*_{ab}$) between two color points. $(L^*_1, a^*_1, b^*_1)$ and $(L^*_2, a^*_2, b^*_2)$, is defined by the distance between the two points and computed by $$\Delta E^*_{ab} = [(L^*_2 - L^*_1)^2 + (a^*_2 - a^*_1)^2 + (b^*_2 - b^*_1)^2]^{1/2} \quad (6)$$

This color space can also be represented by cylindrical coordinates as shown in FIG. 2. The cylindrical coordinate system provides predictors of lightness. L*, chroma, C*, and hue, H*. The chroma correlates the colorfulness of an area and the hue correlates the types of colors such as red, green, blue, yellow, etc. The relationship among a*, b*, C* and H* is given by $$C^* = [a^{*2} + b^{*2}]^{1/2} \quad (7)$$

$$H^* = \tan^{-1}(b^*/a^*) \quad (8)$$

$$a^* = C^* \cos(H^*) \quad (9)$$

$$b^* = C^* \sin(H^*) \quad (10)$$

Color Gamut: A three-dimensional volume which is occupied by all color points (L*, a*, b*) in the CIELAB space produced by a printing system is called color gamut.

Neugebauer Model: This is a color mixing model. In this model the CIELAB color values (L*, a*, b*) or (L*, C*, H*) can be computed for each CMY/CMYK point based on some measurements. Various modifications of the Neugebauer Model are known or possible. For purposes of this invention the Neugebauer Model may be the generally known broad band mode described in the book *Color Technology for Electronic Imaging Devices*, by Henry R. Kang, published by the International Society for Optical Engineering, pages 34–40.

DISCLOSURE OF THE INVENTION

In accordance with this invention the coverage amount represented by the smallest intensity of the three colors is determined. When that amount is above a predetermined value related to less than minimal observable grain, an exponent value is determined as 1 plus a constant times an amount representative of maximum coverage times the square root of 3 divided by the sum of the coverage values squared for each color, these coverage values being on a linear scale with respect to the maximum coverage value. The coverage amount of black is determined as the maximum amount times the quantity of the minimum color value of the three colors, less the foregoing value for observable grain divided by the maximum coverage value less the foregoing value for observable grain raised to the foregoing exponent value. This determines the amount of coverage by black.

As an additional improvement, lightness is redefined on a model which favors less black at the lighter values and more black at the darker values.

Hue is to remain the same, and is known from the original color data. The chroma is refined based on the original chroma, CMY and CMYK full gamut boundaries. Since black value, lightness value, chroma value and hue are known, the new three color values can be found by various techniques which, although known to the art, are cumbersome. However, this operation is not significantly time-dependent as the results are determined initially and then stored as a table or the like.

DESCRIPTION OF THE DRAWINGS

The details of this invention will be described in connection with the accompanying drawings, in which.

DESCRIPTION OF THE EMBODIMENTS

1. Black Ink Computation

Figure 1:
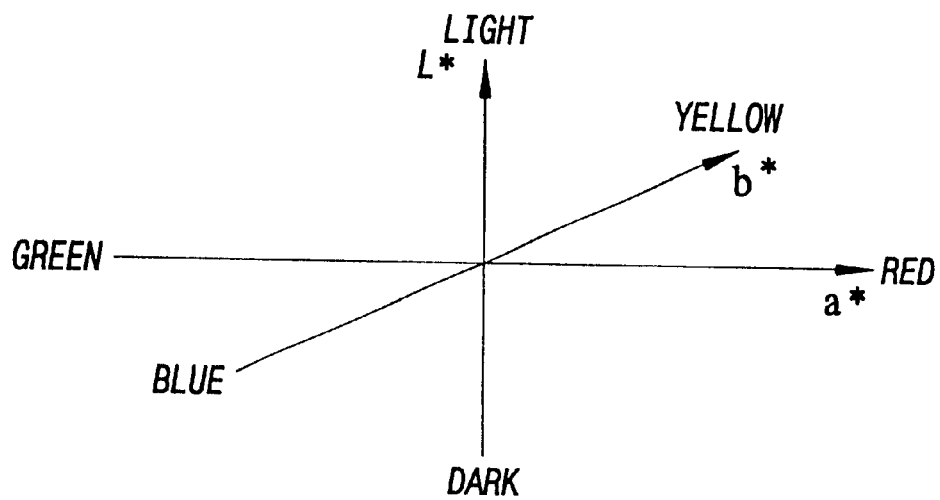
FIG. 1 illustrates the CIELAB color space in a Cartesian coordinate system.
Figure 2:
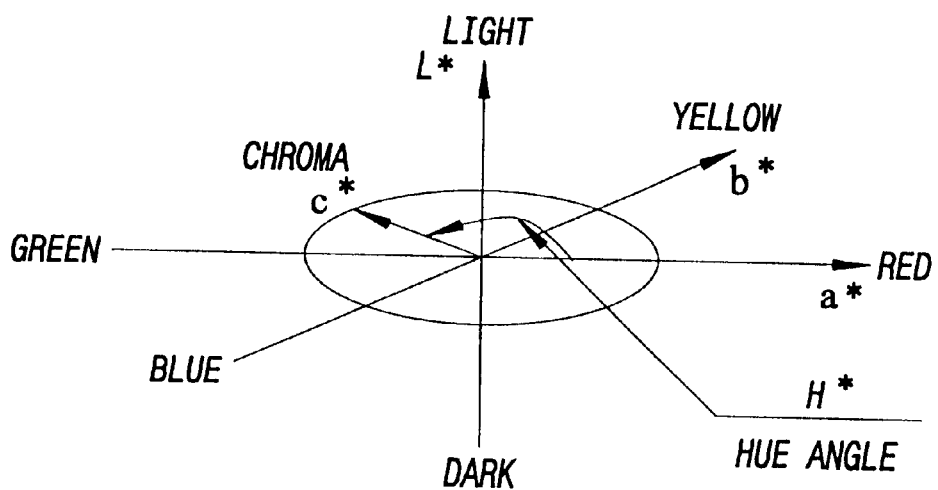
FIG. 2 illustrates the CIELAB color space in a vector coordinate system.
Figure 3:
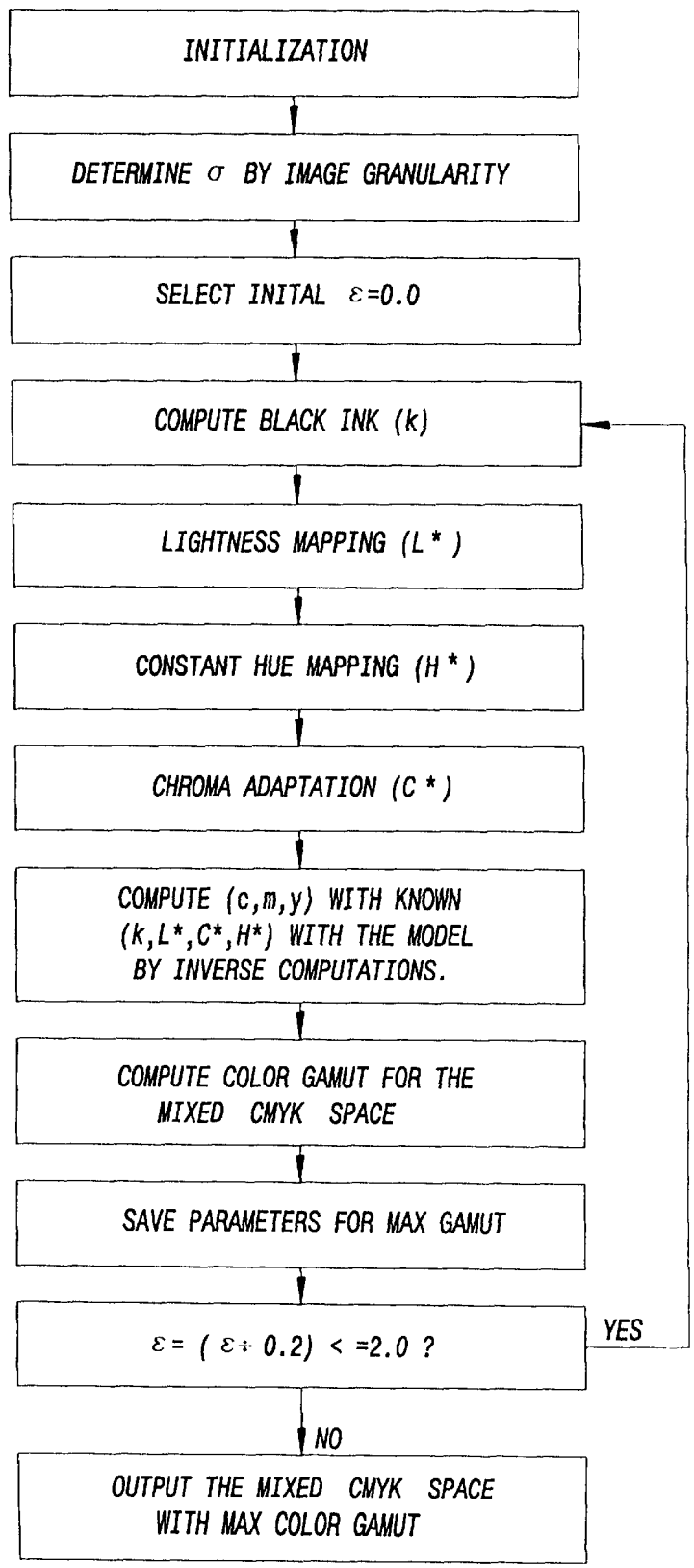
FIG. 3 is a flow diagram of an optimizing iteration to determine a factor for a given printing system.

How much black ink should be used for a CMY point depends on the amount of the process black (the darkness produced by color inks (CMY) is called process black) and the total amount of the color inks of the point. Generally the more the amount of the process black and/or the more amount of the color inks, the higher amount of the black ink should be used but normally not more than the process black (for example, normally k<=65 for the CMY point (65, 255, 255)). For two points with about the same process black, e.g., (65, 75, 85) and (65, 255, 255) CMY points, we may need to use more black ink to replace more process black for the darker point. This is due to the two reasons:

(a) The process black has more dot printed on the paper than the equivalent true black (the ratio is approximately 3 to 1). So, the process black pattern is less grainy than the equivalent true black pattern. This effect is more dominant for light color than for dark color. Therefore, we need to keep more process black for the lighter point.

(b) Using more black to remove more process black for darker point can reduce the total amount of inks and hence reduce the "bleed-through" for the paper. Based on this, we developed the following formula to compute the black ink:

$$k = k_{\max}\left[\frac{\mu - \mu_s}{\mu_{\max} - \mu_s}\right]^\gamma \quad (k = 0 \text{ if } \mu \leq \mu_s) \tag{11}$$

where, $$\mu_s = \min(c_0, m_0, y_0) \tag{12}$$

$$\mu_s = \sigma\left(1 - \frac{1}{k_{\max}}\sqrt{\frac{c_0^2 + m_0^2 + y_0^2}{3}}\right) \tag{13}$$

$$\gamma = 1 + \varepsilon k_{\max}\sqrt{\frac{3}{c_0^2 + m_0^2 + y_0^2}} \tag{14}$$

$$k_{\max} = \mu_{\max} = 255 \quad \text{(for 8 bit value)} \tag{15}$$

The meaning of each parameter in Equations 11–15 is as follows:

(a) k=black ink digital count at a mixing point (P).
(b) $\mu$=minimum color ink digital count at P.
(c) $\mu_s$=a value of $\mu$ below which no black is used at P.
(d) $\mu_{max}$=maximum possible value of $\mu$.
(e) $k_{max}$=maximum black ink digital count.
(f) $\sigma$=a parameter adjusting $\mu_s$ (15%–25% of $k_{max}$ is recommended).
(g) $\gamma$=a parameter controlling the black ink distribution over the colorant space.
 The higher value of $\gamma$ will result in less black ink at a mixing point but does not affect the maximum black ink point.
(i) $\varepsilon$=a parameter used to optimize the total amount of black ink in the colorant space. It does not change from point to point. In the iterative optimizing process it varies from 0.0 to 2.0.

The black ink distribution over the colorant space will be smooth since it is determined by the smooth analytical equations. In the computation of black ink usage, there are two unknown parameters, σ and ε. The parameter σ determines what darkness level we should start to introduce black ink and the parameter ε determines how the black ink amount is distributed over the colorant space.

The parameter σ is determined by image granularity. If we print out a series of patches with $c_0=m_0=y_0=1, 2, 3, \ldots, 255$ and k being determined by Equations 11–15, we will find that the larger values of parameter σ, the more number of lighter patches have no black ink. As mentioned above, the lighter patches/images without black ink will have less granularity (less graininess). The granularity can be determined by visual examination or granularity instrument when available. The optimum value of parameter σ will be the one whose further increasing would not improve the granularity of any light patches.

The parameter ε will be determined by the optimization process described in Section 3.

2. Mixing Process

Figure 4A:
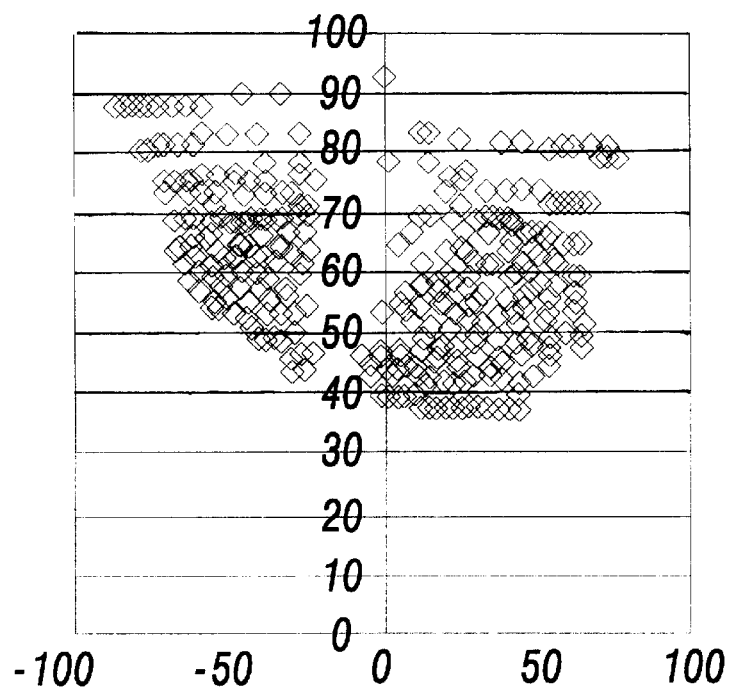
FIG. 4a illustrates a projected CMY full gamut.
Figure 4B:
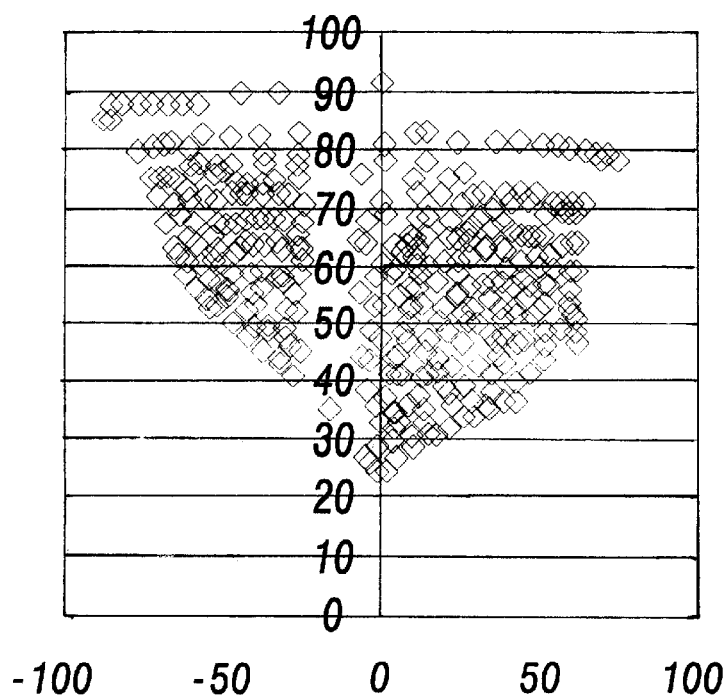
FIG. 4b illustrates a projected CMYK full gamut.

The available gamut (hereinafter "full gamut") produced by a given set of inks can be computed with the modified Neugebauer Model (hereinafter "the model") by inputting all possible ink level combinations to the model. FIG. 4 shows two projected charts of CMY and CMYK full gamuts generated by the model. In reality, however, we would not use all ink level combinations for CMYK printing since some combinations yield too much inks (e.g., a combination of (c=255, m=255, y=255, k=255) would never be used). The goal of our invented mixing method is to obtain a maximized gamut which is the closest to the full gamut while removing the appropriate process black. This will be accomplished by the following procedures combined with the optimization process described in Section 3.

Figure 5:
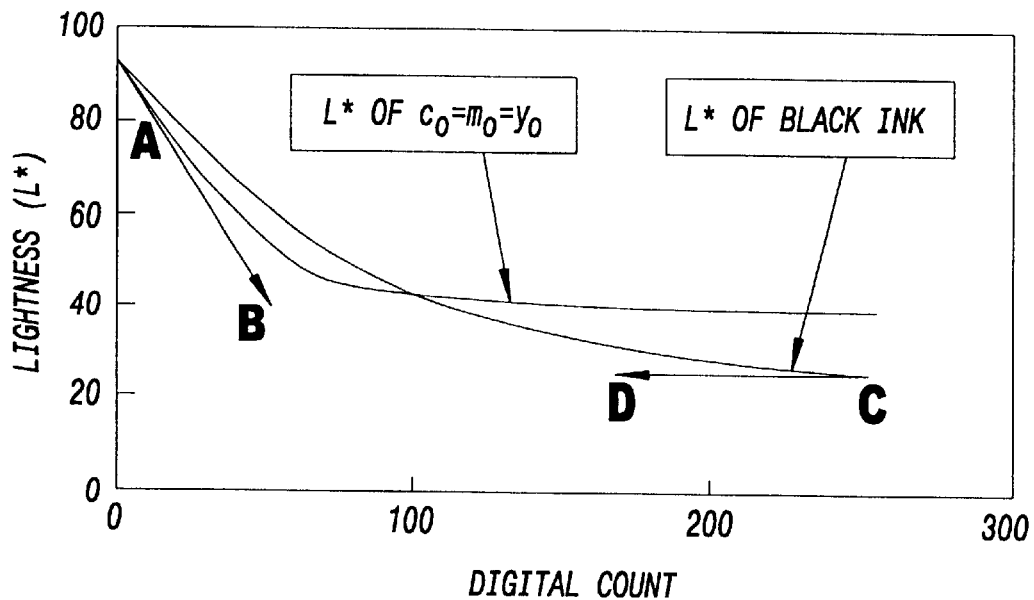
FIG. 5 illustrates lightness profile of process black and true black.

(1) Lightness Mapping: When a CMY point is mixed with black ink, its lightness may be unchanged or changed depending on its position in the colorant space. The lightness of a region with a little black ink should not be changed or changed by a very small amount in order to keep a smooth transition with the neighboring region that has no black ink. For the darkest CMY point, its lightness should be changed by the maximum amount. FIG. 5 shows a lightness profile for equal CMY points ($c_0=m_0=y_0=1, 2, 3, \ldots, 255$) and another lightness profile for black ink ($k=0, 1, 2, 3, \ldots, 255$). Since we expect that, after mixing with black ink, the lighter region has little lightness changes and the darkest CMY point should be mapped to the darkest black ink point, we can construct a new lightness profile with a computer program in the following method:

(a) Along the CMY lightness profile starting from the lightest point, find a tangent line AB as shown in FIG. 5.

(b) Along the black ink lightness profile starting from the darkest point, find a tangent line CD as shown in FIG. 5.

Figure 6:
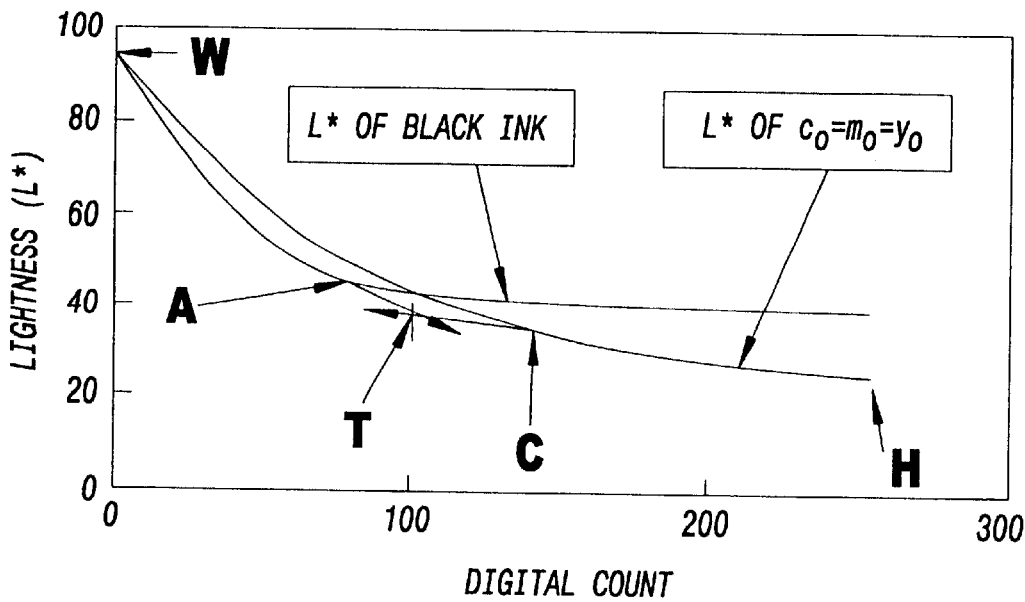
FIG. 6 illustrates a lightness profile of a smooth transition of the process black at high lightness and black at high darkness.

(c) As the AB line moves from light to dark and the CD line moves from dark to light, the angle between the two lines will reach to the minimum (ideally, the angle would become zero). At this time, as shown in FIG. 6, the curve "WATCH" will form a new lightness profile. By using a smoothing procedure, a new smoothed lightness profile will be obtained. This new lightness profile is denoted by:

$$L_k^* = g(k), k=0, 1, 2, 3, \ldots, 255 \tag{16}$$

For any CMY point $(c_0, m_0, y_0)$, the new mapped L* is given by $$L^* = L_0^* + L_k^* - L_p^* \tag{17}$$

where, $L_0^*$=computed with $(c_0, m_0, y_0)$ in the CMY colorant space by the model.

$L_k^*$=given by Equation 16 with k computed by Equations 11–15.

$L_p^*$=process black computed with (k, k, k) in the CMY colorant space by the model.

It is noted that, if we select $k=\min(c_0, m_0, y_0)$ and if $c_0=m_0=y_0$ (a neutral digital line in the CMY colorant space), then we have $L_0^*=L_p^*$ and $L^*=L_k^*$, that is, the lightness profile of the neutral digital line for this situation will be the same as the new constructed lightness profile denoted by Equation 16.

(2) Constant Hue Mapping: After mixing with black ink, a CMY point will keep the same hue angle in the CIELAB space. So its counterpart CMYK point will have the hue angle (H*) given by $$H^* = H_0^* = \tan^{-1}(b_0^*/a_b^*) \tag{18}$$

where, $(a_0^*, b_0^*)$ is computed with $(c_0, m_0, y_0)$ in the CMY colorant space by the model.

Figure 7:
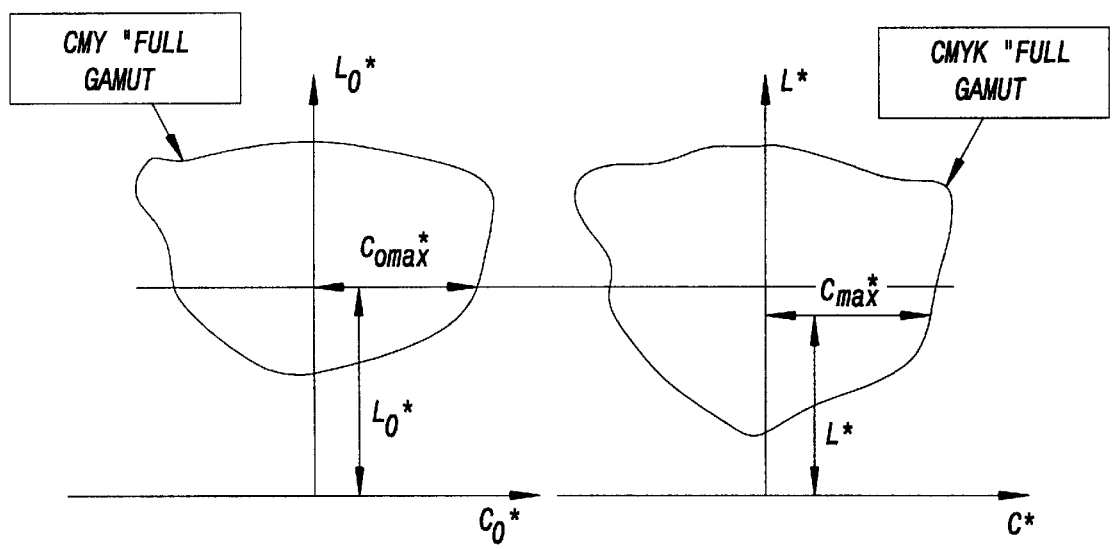
FIG. 7 illustrates relative values of CMY full gamut and CMYK full gamut.

(3) Chroma Adaptation: For any CMY point $(c_0, m_0, y_0)$, we have found the L* and H* by the Lightness Mapping and Constant Hue Mapping for its counterpart CMYK point. Using the CMY and CMYK full gamuts (computed with all combinations of available inks by the model), we can determine the C* of the mixed CMYK point by $$C^* = (C_{max}^*/C_{0max}^*) C_0^* \tag{19}$$

where, $C_{max}^*$ is the maximum chroma at (L*, H*) (FIG. 7) in the CMYK full gamut, $C_{0max}^*$ is the maximum chroma at $(L_0^* H_0^*)$ (FIG. 7) in the CMY full gamut, and $(L_0^*, C_0^*, H_0^*)$ is computed with $(c_0, m_0, y_0)$ in the CMY colorant space by the model.

Now, for any given CMY point $(c_0, m_0, y_0)$, we can compute black ink (k) with Equations 11–15, and determine the $L_0^*$, C* and H* for the mixed CMYK point (c, m, y, k) by the Lightness Mapping, Constant Hue Mapping, and Chroma Adaptation. With the known values of (k, L*, C* and H*), we can further determine the unknown values of (c, m, y) using the Neugebauer Model either directly with iterations or by inverse computation. This will complete a process of mixing a CMY point into its counterpart CMYK point.

2. Optimization Process

The above procedure has mixed a CMY space into a CMYK space. This mixing may not yield a gamut which is the closest to the CMYK full gamut if the black ink usage is not appropriate. To maximize the mixed CMYK gamut, the following optimization process should be conducted.

(1) Change the black ink distribution by varying the parameter ε in Equation 14 from 0.0 to 2.0.

(2) Compute the black ink with Equations 11–15 for a given value of ε.

(3) Mix all CMY points into CMYK point using the procedures described in Section 2.

(4) Compute the mixed CMYK gamut using the modified Neugebauer Model.

(5) Select one mixed CMYK space (corresponding to one value of parameter $\epsilon$) which has the maximum gamut.

Figure 8A:
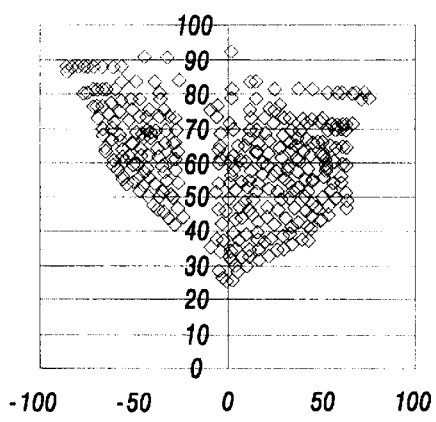
FIG. 8a illustrates CMYK full gamut.
Figure 8B:
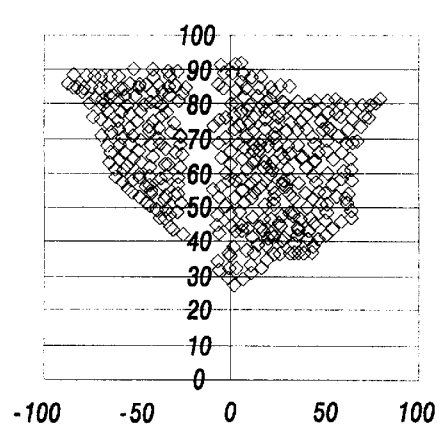
FIG. 8b illustrates CMYK gamut resulting from this invention.

FIG. 8 shows a projected chart for a mixed CMYK gamut together with the CMYK full gamut for plain paper. It can be seen that the two gamuts are very close.

Illustrative Example

In practice, printing is by small bits or dots not discernable individually by the ordinary observer. The cyan, magenta and yellow are subtractive colors. Ideally, the two or three colors would normally be placed on top of each other to form a different color (or process black when all three colors are printed). In practice, however, applying the bits or dots from a predetermined pattern (termed a matrix) results in foreign, observable shapes or pattern (termed artifacts).

Accordingly, applying the bits or dots in a random pattern, different for each color and black, is often utilized. Since the patterns are random, the bits or dots may not coincide, especially for light images. However, the adverse visual effects from this are minimal. This invention is applicable to both matrix and random printing by overlay.

In the foregoing, a general method is given to mix black ink into CMY colorant space. By this method, all 16 million points of the CMY colorant space (256 levels for each colorant (0, 1, 2, 3 . . . 254, 255), and all combinations of the three colorants=256×256×256=16,777,216) will be mixed as 16 million CMYK points (cyan, magenta, yellow and black). The following is an example of one CMY point being mixed as one CMYK point that is given in detail. Then a comparison between the prior art and the present invention is presented.

I. Mixing from CMY to CMYK

In this section, we take CMY=(85, 115, 150) (Cyan=85, magenta=115 and yellow=150) as an example to show how a CMY point is mixed as a CMYK point for plain paper media using this invention. Since the parameter $\epsilon$ is changed in the iterated computational optimization, we select $\epsilon=0.5$ for the example of computation.

1. Black Ink Computation:

(1) Determine Parameter ($\sigma$)

The parameter $\sigma$ is determined by image granularity. For this, a series of patches are printed with $c_0=m_0=y_0=1, 2, 3 \ldots, 128$ and k=0 for one set and k=1 for another set of patches. Then each patch is visually examined with k=1 from the lightest to the darkest and we will find a patch at which the graininess is not worse than the corresponding patch with k=0. This patch number (say $33^{rd}$ patch, i.e. $c_0=m_0=y_0=33$) will be able to start using black. Patches lighter than this one should not use black. Denote this point as $(c_{0s}, m_{0s}, y_{0s})$. If the $33^{rd}$ patch can start using black, then we have $C_{0s}=m_{0s}, y_{0s}=32$ (or 33−1).

From Equation 11, it is known that k=0 will result in $\mu_s$.

From Equations 12–13, we will have:

$$\sigma = \min(c_{0s}, m_{0s}, y_{0s}) / \left(1 - \frac{1}{k_{max}}\sqrt{\frac{c_{0s}^2 + m_{0s}^2 + y_{0s}^2}{3}}\right) \quad (E1)$$

For $c_{0s}=m_{0s}=y_{0s}=32$, and $k_{max}=255$, we have $\sigma=36.59$.

(2) Compute Black Ink (k):

From Equations 11–15 and the known value $\sigma=36.59$ and the selected value $\epsilon=0.5$, the black ink is computed for any given CMY points. For CMY=(85, 115, 150), we have k=18.

2. Mixing Process:

A Neugebaure Model is used to compute the CIELAB values for any given CMY or CMYK points.

(1) Lightness Mapping:

By using our invented process, we can compute $L_k^*$, $L_0^*$, $L_p^*$ for CMY=(85, 115, 150) and k=18 as follows:

$L_k^*=73.8$ $L_0^*=42.7$ $L_p^*=74.3$

Using equation 17, we have $L^*=42.2$ (2) Constant Hue Mapping:

After mixing with black, we keep the same hue angle. The point CMY=(85, 115, 150) has the following CIELAB values:

$$L_0^*=42.7,\ a_0^*=1.9,\ b_0^*=1.9,\ C_0^*=(1.9^2+1.92^2)^{1/2}=2.7$$

and hue angle:

$$H^*=H_0^*=\tan^{-1}(b_0^*/a_0^*)=45°$$

(3) Chroma Adaptation:

Using the modified Neugebauer Model, compute the CMY and CMYK full gamut boundaries. From the CMY boundary, we can find the maximum (boundary) chroma ($C_{0max}^*$) at $L_0^*=42.2$ and $H_0^*=45°$ for CMY=(85, 115, 150). And from the CMYK boundary, we can find the corresponding black-mixed maximum (boundary) chroma (C max*) at $L_0^*=42.2$ and $H_0^*=45°$.

These two values are as follows:

$C_{0max}^*=6.9$ $C_{max}^*=27.1$

Thus, the chroma ($C^*$) for the corresponding black-mixed point will have (Equation 19):

$$C^*=(C_{max}^*/C_{0max}^*)C_0^*=(27.1/16.9)\times 2.7=10.6$$

So, we have found the CIELAB values for the black-mixed point:

$$(L^*, C^*, H^*)=(42.2, 10.6, 45)$$

or (see Equations 9–10 in the foregoing):

$$(L^*, a^*, b^*)=42.2, 7.5, 7.5)$$

Using the above CIELAB values and the computed k=18, we can find the closest CMYK point through the Neugebauer Model and iterated computations. The final result is as follows:

CMY=(85, 115, 150)

is mixed as:

CMYK=(51, 99, 143, 18)

II. Some Advantages

In the following computation, the prior art is based on the Equations 1–5. The black ink usage equation (Equation E1) is selected as the following form:

$$k = k_{\max}\left[\frac{\mu - \mu_0}{\mu_{\max} - \mu_0}\right]^\beta \quad (k = 0 \text{ if } \mu \leq \mu_0) \tag{E2}$$

Where $\mu_0$ is a value of $\mu$ below which no black is used. Here $\mu_0=32$ is selected which is the same as that we selected for the computation of the present invention for reasonable comparison. For the same reason, we selected the power value $\beta=2.1$ so that at a lighter point CMY=(100, 100, 100), both the prior art and the present invention can result in the same black ink (k). In Equations 3–5, we select $a_1=a_2=a_3=1.0$, which is most often-used case.

1. Black Ink Distribution:

The following table shows that at the lighter point CMY=(100, 100, 100) and the darkest point CMY=(255, 255, 255), both methods have the same K values: 21 and 255 respectively. However, the prior art gives the same k value (21) for a darker point CMY=(100, 240, 240) as for a lighter point CMY=(100, 100, 100). Whereas, the present invention gives more than double black ink (52) for the darker point compared to the prior art. Obviously, the black ink distribution is more reasonable in the present invention than in the prior art.

TABLE 1

Black Ink Distribution of Prior Art and Present Invention

| CMY | K from Prior Art | K from Present Invention |
|---|---|---|
| 100, 100, 100 | 21 | 21 |
| 100, 240, 240 | 21 | 52 |
| 255, 255, 255 | 255 | 255 |

Figure 9:
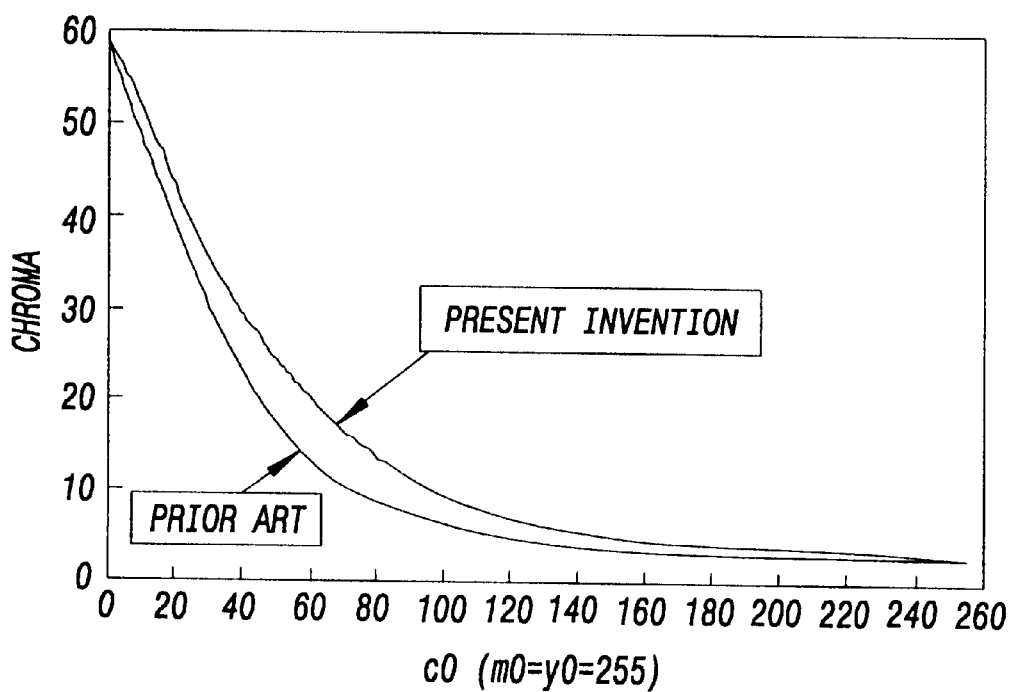
FIG. 9 illustrates chroma distributions along red-to-black line of prior art and this invention.

2. Color Gamut:

FIG. 9 shows the mixed CMYK chroma distribution along the Red-to-Black line where CMY point changes from (0, 255, 255) to (255, 255, 255). It is shown that the present invention has much higher chroma (higher gamut). The area under the curve is 2898.6 (a*b*) for the prior art, and 3563.0 (a*b*) for the present invention. The present invention increases the gamut by 23% for this portion of the mixed CMYK gamut.

When creating a printer profile, one can sample the mixed CMYK space for accurate calibration in the same way as for the CMY space since each CMY point has a link with a CMYK point in the mixed CMYK space. By using the mixed CMYK space, the printer profile will yield a smoothed and maximized color gamut to achieve better printing quality.

What is claimed is:

1. The method of printing with overlayed inks of three separate colors and separate black from data defining only the separate colors comprising:
printing an amount of coverage of black ink in an amount defined substantially as follows:

$$k = k_{\max}\left[\frac{\mu - \mu_s}{\mu_{\max} - \mu_s}\right]^\gamma$$

where, $$\gamma = 1 + \varepsilon k_{\max}\sqrt{\frac{3}{c_0^2 + m_0^2 + y_0^2}}$$

k is said amount of coverage of black ink;

$\mu_s$ is a predetermined amount at or larger than the amount at which minimal grain is observed;

$\mu$ is the minimum amount on a linear scale of the amount of coverage defined by said data of said three colors;

$\mu_{max}$ is the maximum possible amount of black ink;

$\varepsilon$ is a constant in the range of 0.2 and 2.0; and $c_0$, $m_0$, $y_0$ are the amount of coverage on a linear scale defined by said data for said three colors respectively.

2. The method of printing with overlayed inks of three separate colors and separate black from data defining only the separate colors comprising:

determining an amount of black ink to be printed with inks of said three separate colors to reduce the amount of processed black to be printed, determining a lightness based on a model which is a smooth transition from less black for lighter images and more black for darker images, determining a chroma based on a original chroma, CMY and CMYK full gamut boundaries, determining an amount of black ink to be printed by changing the black ink distribution over a colorant space to increase the color gamut, and printing said determined amount of black ink and color inks in amounts defined by the said determined lightness and said determined chroma and said determined amount of black ink.

3. The method of printing as in claim 2 wherein the amount of coverage of black ink is in accordance with claim 1.

* * * * *